(12) United States Patent
Jia et al.

(10) Patent No.: US 9,914,798 B2
(45) Date of Patent: Mar. 13, 2018

(54) SUPRAMOLECULAR ELASTOMER NETWORKS CONTAINING GRAFTED OLIGOAMIDE HARD COMPONENTS

(71) Applicants: Li Jia, Hudson, OH (US); Joseph John Scavuzzo, Brigham City, UT (US); Kai Li, Beijing (CN)

(72) Inventors: Li Jia, Hudson, OH (US); Joseph John Scavuzzo, Brigham City, UT (US); Kai Li, Beijing (CN)

(73) Assignee: The University of Akron, Akron ( * ) Notice: Subject to any disclaimer, the term of this patent is extended or adjusted under 35 U.S.C. 154(b) by 0 days.

(21) Appl. No.: 15/125,283

(22) PCT Filed: Mar. 13, 2015

(86) PCT No.: PCT/US2015/020407
§ 371 (c)(1),
(2) Date: Sep. 12, 2016

(87) PCT Pub. No.: WO2015/138871
PCT Pub. Date: Sep. 17, 2015

(65) Prior Publication Data
US 2017/0081455 A1     Mar. 23, 2017

Related U.S. Application Data

(60) Provisional application No. 61/952,250, filed on Mar. 13, 2014.

(51) Int. Cl.
*C08F 279/02* (2006.01)
*C08L 21/00* (2006.01)
*C08C 19/22* (2006.01)

(52) U.S. Cl.
CPC ............ *C08F 279/02* (2013.01); *C08C 19/22* (2013.01); *C08L 21/00* (2013.01)

(58) Field of Classification Search
CPC ......... C08F 279/02; C08C 19/22; C08L 21/00
See application file for complete search history.

(56) References Cited

U.S. PATENT DOCUMENTS

| 2,922,780 | A | 1/1960 | D'Amico et al. |
| 6,783,709 | B2 | 8/2004 | Harreld et al. |
| 2013/0012652 | A1 | 1/2013 | Araujo Da Silva et al. |

FOREIGN PATENT DOCUMENTS

| WO | 2013163286 A2 | 10/2013 |
| WO | 2013164843 A1 | 11/2013 |

*Primary Examiner* — Robert Jones, Jr.
(74) *Attorney, Agent, or Firm* — Renner Kenner Greive Bobak Taylor & Weber

(57) ABSTRACT

An oligoamide-modified elastomer includes an elastomer having oligoamide units grafted to the elastomer and forming a plurality of sheet-like structures through hydrogen bonding, the sheet-like structures interacting through non-covalent interactions to form crystalized domains within the elastomer.

9 Claims, 6 Drawing Sheets

SUPRAMOLECULAR ELASTOMER NETWORKS CONTAINING GRAFTED OLIGOAMIDE HARD COMPONENTS

CROSS-REFERENCE TO RELATED APPLICATIONS

The present application claims priority to U.S. Provisional Patent Application Ser. No. 61/952,250, filed Mar. 13, 2014, the entirety of which is incorporated herein by reference.

FIELD OF THE INVENTION

The present invention generally relates to the use of oligoamides for physically crosslinking rubber. In some embodiments, the present invention relates to the creation of thermoplastic elastomer compositions. The thermoplastic elastomer composition includes an elastomer having dispersed crystalline domains (nanoassemblies) formed by oligoamides being covalently linked therein. The oligoamides form sheet-like structure via hydrogen bonding, and the sheets stack through non-covalent interactions, such as van der Waals forces and dipole-dipole interactions, to crystalline domains. In some instances, an elastomer that does not show thermoplastic properties is modified with the oligoamides to then exhibit thermoplastic properties.

BACKGROUND OF THE INVENTION

Thermoplastic elastomers (TPEs) are block co-polymers made of a hard component and a soft component. The two components undergo microphase separation. The solid domains formed by the hard component are glassy or crystalline. The solid domains are dispersed within a matrix of the soft component and act as both physical crosslinkers and filler particles. The polymer chains of the soft component have a Tg below the service temperature and are able to stretch but are restricted from flowing by the solid domains formed by the hard component. In the absence of the hard component, the soft component can flow. TPE networks can be recycled, and can be prepared by liquid processing technologies.

In conventional TPEs, the molecular weights of the hard and soft components have to reach a relatively high value for effective microphase separation. Even after the above molecular weight requirements are satisfied, there is still a certain degree of mixing in the microdomains. The incomplete segregation often compromises the properties and causes problems such as plastic deformation. For block copolymer TPEs, where the block responsible for physical crosslink is usually a styrenic block, the service temperature cannot exceed the glass transition temperature of polystyrene (Tg=-90° C.), which significantly limits their usefulness.

Supramolecular TPEs are TPEs containing monodisperse crystallizable hard segments. Most supramolecular TPEs known to date are segmented TPEs with polyether or polyester soft components (Eisenbach, C. D.; Baumgartner, M.; Günter, C. in *Advances in Elastomers and rubber elasticity*, Eds. Lal, J. and Mark, J. E.; 1986, Plenum Press: New York). Compared to conventional TPEs, the supramolecular TPEs display complete phase separation, sharp melting temperature, low plastic deformation, and improved strength (Gaymans, R. J. *Prog. Polym. Sci.* 2011, 36, 713-748).

Some grafted copolymer thermoplastic elastomers (TPEs) are characterized by elastomeric chains that are physically crosslinked by the interaction of associating pendent groups. Supramolecular TPEs with the monodisperse hard segments grafted to the elastomer backbone have not met much success because they have not been shown to possess the strength of typical TPEs. If the molecular weight between crosslinks, which is the molecular weight of soft segment for segmented TPEs and the molecular weight between grafts ($M_G$) for grafted TPEs, is too low, the material will behave with more plastic character than elastic, for example, a yield point will appear.

Stadler at el. examined polybutadiene grafted with 4-(3,5-di-oxo-1,2,4-triazolin-4-yl)benzoic acid (TZB) (Hilger, C.; Stadler, R. *Makromol. Chem.* 1990, 191, 1347-1361). The structure of TZB contains two hydrogen bonding sites; the carboxylic acid and the urazole. These two sites associate as urazole-urazole and acid-acid pairs to from an extended hydrogen bonded structure. The extended hydrogen bonded structures aggregate together to form a higher ordered bundle-like structure, which is phase separated from the polybutadiene segments. As the result of phase separation, the above TZB-grafted polybutadienes are elastic solids below the melting temperature of the TZB domains.

Stadler's study focused on tensile properties at low strain (<300%) and did not report the ultimate strength and strain. In this system, because TZB has a fixed molecular weight, increase of TZB content necessarily decreases the molecular weight between grafts, $M_G$ (i.e., TZB has to be densely grafted in order to achieve a certain high weight percent). Even when the weight percent of TZB is only 4%, $M_G$ is already too low. As a result, plastic yielding occurs as indicated by a yield point in the stress-strain curve. This means, although Stadler did not show because only low strain data were given, that a strong elastomer without plastic yielding cannot be obtained by TZB.

Recently, Hélène Montès et al prepared grafted polydimethysiloxane (PDMS) with monodisperse bis-ureas for the associating groups (Colombani, O.; Barioz, C.; Bouteiler, L.; Chanéac, C.; Fompérie, L.; Lortie, F.; Montès, H. *Macromolecules* 2005, 38, 1752-1759). The bis-urea segments phase separate to form crystalline domains.

The two grafted copolymers have very similar weight percentages of hard content, but differ in their total molecular weights. Polymer PDMS(13)-g-BuP has a low molecular weight of 10,500 g/mol. At this molecular weight this polymer is analogous to BuP/PDMS(4)/BuP in that the soft block molecular weight is too low for sufficient entanglement. The result is a weak material. The higher molecular weight BuP/PDMS(30)/BuP (31,000 g/mol) displays an ultimate strength (4 MPa) and ultimate strain (300%) that are higher than the other polymers. However, most application would require much better strength/strain at break. Presumably, the molecular weight and the weight/volume percent of the hard domain are inadequate. In addition, the bisurea segment decomposes at 150 C to result in covalent crosslink.

In prior work represented in U.S. patent application Ser. No. 14/396,951, it was demonstrated that a thermoplastic elastomer is obtained by end-functionalizing polyisobutylene with oligo(β-alanine). However, the TPE does not possess the high strength typical of thermoplastic elastomers. It is here posited the low strength is a result of the molecular weight and the weight/volume percent of the hard domain being inadequate.

In summary, elastomers with grafted or end-functionalizing, monodisperse hard segment have so far not been able to show the strength and elasticity that conventional triblock styrenic TPEs and segmented polyurethane TPEs possess. Bonuses (Gaymans, R. J. *Prog. Polym. Sci.* 2011, 36, 713-748) displayed by supramolecular segmented TPEs over the conventional TPEs can be expected if the strength issue can be solved.

Since many desirable hydrocarbon elastomer backbones can be used as the soft component in grafted TPEs, supramolecular grafted TPEs can be expected to occupy the market space of hydrocarbon TPEs typically different from the market of aforementioned segmented TPEs with polar polyether or polyester soft components.

SUMMARY OF THE INVENTION

It is here posited and supported by evidence that, in order to achieve high strength and high elastic extensibility, the molecular weight of the polymers ($M_{total}$) must be high, the volume/weight percent of reinforcing domains must be adequate, and the molecular weight between grafts ($M_G$) must not be too low. None of prior art meets or is capable to meet the three requirements simultaneously. The grafted copolymer molecular architecture in FIG. 1 can meet all three requirements. As we will demonstrate, the new grafted polymers are strong and extensible. Further, they remain elastic solids below the melting temperature of the hard domains. Since some of them have hard domains with high melting temperature owing to the tenability of the molecular structure of the oligoamide, they remain elastic solid at high temperatures up to 135° C.

Figure 1:
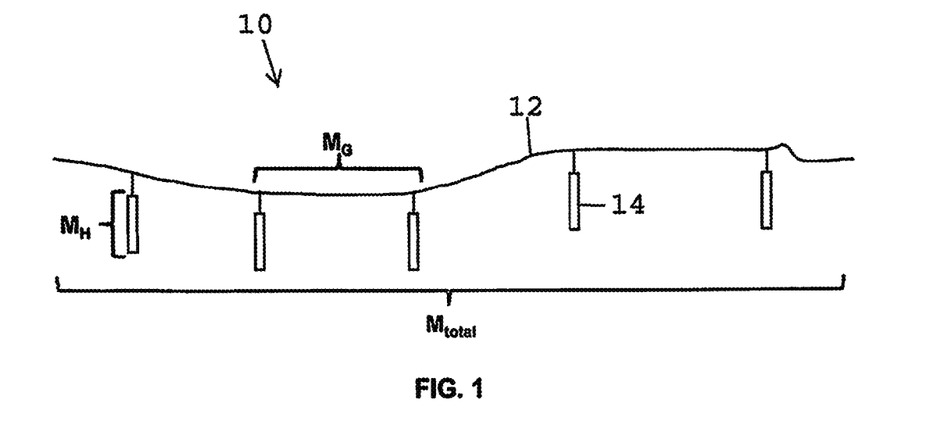
FIG. 1 schematic representation of a grafted elastomer illustrating the $M_G$, $M_H$, and $M_{total}$ variables disclosed herein.

The grafted copolymer thermoplastic elastomers with the molecular construct shown in FIG. 1 have three desirable molecular characteristics simultaneously: high total molecular weight of the TPE, appropriate $M_G$ (not too low and not too high), and adjustable volume percent of the hard segment without affecting $M_G$. This has resulted in high strength, high extensibility and elastic recoverability, and performance at high temperature.

In a first embodiment, the present invention provides an oligoamide-modified elastomer comprising; an elastomer with a number average molecular weight no less than 80,000 g/mol and a weight-average molecular weight no less than 100,000 g/mol having oligoamide units grafted to said elastomer and forming a plurality of sheet-like structures through hydrogen bonding, the sheet-like structures interacting through non-covalent interactions to form crystalized domains within the elastomer.

In a second embodiment, the present invention provides an oligoamide-modified elastomer as in the first embodiment, wherein the oligoamide units are selected from peptides, β-peptides, and aramid oligomers.

In a third embodiment, the present invention provides an oligoamide-modified elastomer as in either the first or second embodiment, wherein the oligoamide units are covalently linked to the elastomer.

In a fourth embodiment, the present invention provides an oligoamide-modified elastomer as in any of the first through third embodiments, wherein the oligoamide units are β-alanines according to the following structure:

wherein z is from 1 to 6.

In a fifth embodiment, the present invention provides an oligoamide-modified elastomer as in any of the first through fourth embodiments, wherein the oligoamide units are aramids according to one of the following structures:

wherein z is from 1 to 6.

In a sixth embodiment, the present invention provides an oligoamide-modified elastomer as in any of the first through fifth embodiments, wherein said elastomer has a glass transition temperature Tg below room temperature, and the oligoamide-modified elastomer has a Tg above room temperature.

In a seventh embodiment, the present invention provides an oligoamide-modified elastomer as in any of the first through sixth embodiments, wherein said elastomer is selected from the group consisting of poly(isobutylene-co-isoprene), polyisoprene, polybutadiene, poly(styrene-co-butadiene), poly(dimethylsiloxane), ethylene propylene diene monomer (EPDM) rubber, hydrogenated polybutadiene, hydrogenated polyisoprene, hydrogenated poly(styrene-cobutadiene), and combinations and derivatives thereof.

In an eighth embodiment, the present invention provides an oligoamide-modified elastomer as in any of the first through seventh embodiments, wherein said elastomer is poly(isobutylene-co-isoprene), also known as isobutylene-isoprene rubber.

In a ninth embodiment, the present invention provides a process of forming a thermoplastic elastomer comprising the steps of: covalently linking oligoamide units as pendant groups on an elastomer, the oligoamide units forming a plurality of sheet-like structures through hydrogen bonding, the sheet-like structures interacting through non-covalent interactions to form crystalized domains within the elastomer.

DETAILED DESCRIPTION OF ILLUSTRATIVE EMBODIMENTS

The invention described here is directed to supramolecular thermoplastic elastomers (TPEs) 10 consisting of a high molecular weight elastomeric polymer chains 12 grafted with oligoamides 14 (FIG. 1) that form non-covalent supramolecular hard domains. The oligoamides 14 are known to have high propensity to form highly specific, hydrogen bonding, crystalline domains. These crystalline domains serve as phase-separated, physical crosslink junctions. In particular embodiments, elastomers having a glass transition temperature of below room temperature (i.e., flowable elastomers showing liquid properties) are modified with oligoamide grafted to the elastomer backbone, and this modification results in the oligoamide-modified elastomer having thermoplastic properties at room temperature.

In some embodiments, the present invention is generally directed to the grafting of oligoamides onto elastomers that normally do not show thermoplastic properties. The incorporation of the oligoamides results in oligoamide-modified elastomers showing thermoplastic properties. The oligoamides are covalently linked to the elastomer and form hard domains in the elastomer. The oligoamides are chosen according to their ability to self-assemble into sheet-like secondary structures through hydrogen bonding. The oligoamides form a plurality of sheet-like structures through hydrogen bonding, and these sheets interact through non-covalent interactions such as van der Waals forces and dipole-dipole interactions and form crystallized, reinforcing domains (nanoassemblies) within the elastomer matrix.

The oligoamides are grafted to the backbone of the elastomer to serve as the hard segment of the TPEs. Properties can be adjusted by adjusting the molecular weight between grafts $M_G$, and the volume of reinforcing domains can be controlled independently of the $M_G$ by adjusting the hard segment length. By adjusting the segment length ratios, the stiffness and strength of the elastomer can be increased.

The elastomer employed may be virtually any elastomer with a weight-average molecular weight no less than 100,000 g/mol and a number-average molecular weight no less than 80,000 g/mol. In some embodiments, the elastomer will have a glass transition temperature Tg below room temperature.

In some embodiments, the elastomer has at least 2 pendant functional groups for reaction with the oligoamide to graft the same to the elastomer backbone. In some embodiments, the elastomer has at least 3 pendant functional groups.

In some embodiments, the $M_G$ is from 4000 to 60,000 g/mol.

Suitable polymers will have a relatively low Tg and may include, but are not limited to, poly(isobutylene-co-isoprene) (also known as butyl rubber or isobutylene-isoprene rubber), polyisoprene, polybutadiene, poly(styrene-co-butadiene), poly(dimethylsiloxane), ethylene propylene diene monomer (EPDM) rubber, hydrogenated polybutadiene, hydrogenated polyisoprene, hydrogenated poly(styrene-cobutadiene), or any combinations and/or derivatives thereof. In some embodiments, the polymer comprises butyl rubber.

Butyl rubber has been grafted with oligo(b-alanine)s through the unsaturation from the isoprene monomer. $M_G$ can be controlled by starting with commercial butyl rubber containing various amount of isoprene monomers and either fully converting the isoprene monomers or converting a fraction of them by controlling the stoichiometry of the grafting agent.

The oligoamides are oligomers of amino acids. In some embodiments, suitable oligoamides are selected from peptides, β-peptides, and aramid oligomers. In some embodiments, suitable oligoamides are selected from peptides having from 1 to 10 amino acid residues. Suitable peptides include, but are not limited to, alanine, alanine-glycine, leucine, and isoleucine. In some embodiments, the oligoamides are oligo(β-alanine)s. In some embodiments, the oligoamides are aramid oligomers.

In some embodiments, the elastomer is devoid of polydimethylsiloxane. In some embodiments, the oligoamide is devoid of bisureas. In some embodiments, the elastomer is devoid of polydimethylsiloxane and the oligoamide is devoid of bisureas.

In some embodiments, the oligoamides are oligo(β-alanine)s according to the following structures:

where the structural motif enclosed in the dotted frame is the oligoamide, wherein z is not to be limited to any particular number. In some embodiments, z will be from 1 to 6. In some embodiments, z will be from 2 to 4. This structure forms stacked β-sheets (beta sheets) through hydrogen bonding. These sheets associate into nanoassemblies through van der Waal forces and perhaps dipole-dipole interactions that segregate from the elastomer to form crystalline domains. These domains provide structure suitable for the elastomer show thermoplastic behavior, where the original elastomer did not.

The R group is a moiety suitable for carrying out a method of grafting the oligoamide to the elastomer as described herein, and the R' group is a non-reactive group chosen to avoid reacting with an elastomer or a curable functional group.

In some embodiments, the oligoamides are oligoaramids according to the following structures:

where the structural motif enclosed in the dotted frame is the oligoamide, wherein z is not to be limited to any particular number. In some embodiments, z will be from 1 to 6. In some embodiments, z will be from 2 to 4. This structure forms sheets through hydrogen bonding. These sheets associate into nanoassemblies through van der Waal forces and perhaps dipole-dipole interactions that segregate from the rubber to form crystalline domains. In other embodiments, one R group is a non-reactive group chosen to avoid reacting with an elastomer, while the other R' group is suitable for covalently linking the oligoamide to an elastomer.

In some embodiments, an elastomer with pendant functionality is reacted with an oligoamide having attached functionality so as to covalently bond the oligoamide to the elastomer. The oligoamides form crystalline domains in the resultant oligoamide-modified elastomer and result in TPEs.

Grafting the oligoamides to the elastomer allows for easy adjustment of several structural parameters. First, the length of the oligoamide segments (herein z) can be adjusted. This will change both the weight percent of the crystalline domains and the size of the crystalline domains in the oligoamide chain direction. Second, the average molecular weight between hard segments (herein $M_G$) can also be adjusted. Having the ability to adjust $M_G$ allows z to be adjusted independently of hard segment weight percent.

Control of $M_G$ can be realized by employing an elastomer with a desired concentration of pendant reactive sites on the backbone or by varying the stoichiometry of the grafting agent.

In some embodiments, the oligoamide is present in the oligoamide-modified elastomer at from 0.5 to 50 weight percent (wt %). In other embodiments, the supramolecular filler is present at from 0.5 to 40 wt %, in other embodiments, from 0.5 to 30 wt %, in other embodiments, from 0.5 to 20 wt %, in other embodiments, from 0.5 to 10 wt %, and in other embodiments, from 0.5 to 5 wt %.

In order to introduce an oligoamide into the elastomer, a functional oligoamide and a pendantly functional elastomer must first be provided. Next, the oligoamide and elastomer are reacted to covalently bond the oligoamide to the elastomer.

Figure 2:
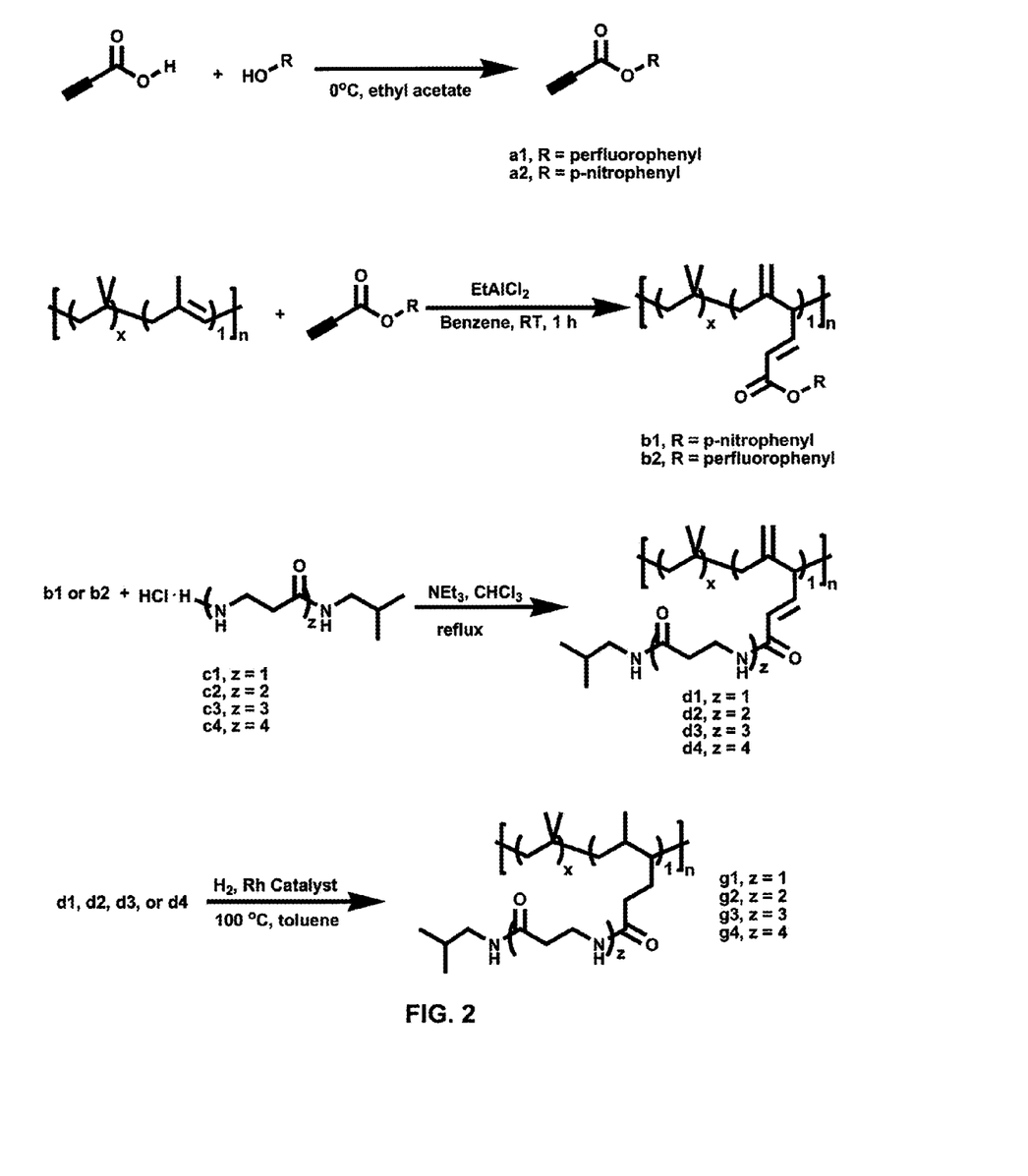
FIG. 2 shows an exemplary reaction scheme for obtaining oligoamide-modified elastomers in accordance with this invention.
Figure 9:
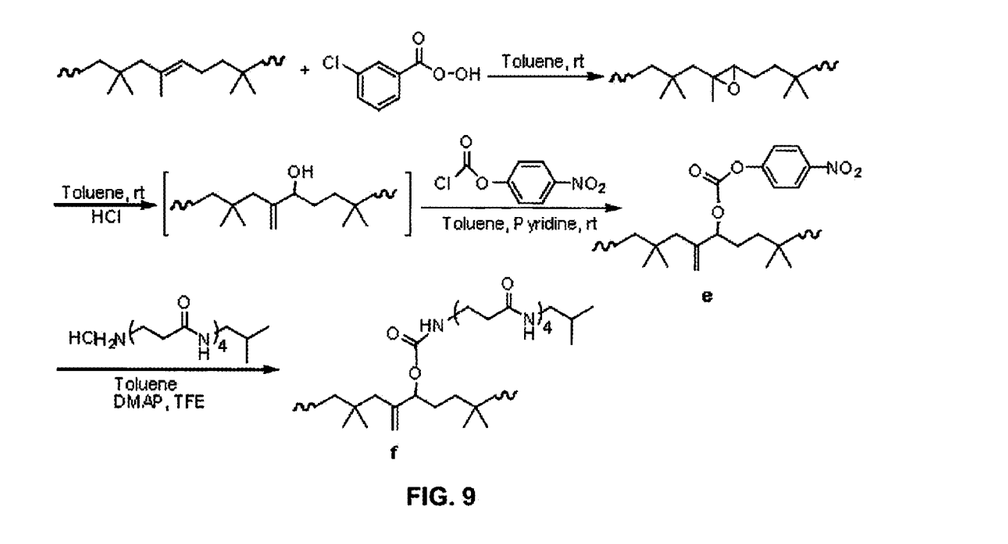
FIG. 9 shows an exemplary reaction scheme for obtaining oligoamide-modified elastomers in accordance with this invention.

Examples of synthetic schemes that achieve the above covalent linkage between the oligoamide and the elastomer are shown in FIGS. 2 and 9.

The peptide segments of the supramolecular filler tend to form multiple hydrogen bonds with neighboring peptide segments to form β-sheets or sheet secondary structures of the type described in J. Poly. Sci. Part A-2 1970, 8, 1703, the disclosure of which is incorporated herein by reference in its entirety. Some suitable amino acids include, but are not limited to alanine, β-alanine, glycine, leucine, and isoleucine. In some embodiments, the peptide segment is an oligo(alanine). In some embodiments, the peptide segment is an oligo(alanine-glycine). In other embodiments, the peptide segment is an oligo(β-alanine). The peptide segments may be synthesized stepwise using standard solution-phase procedures for coupling amino acids known in the art or other known and unknown methods.

The peptides used are relatively short, having from 2 to 10 amino acid residues. In some embodiments, the peptides have from 2 to 6 amino acid residues. In some embodiments, the peptides have from 2 to 5 amino acid residues.

In some embodiments, the peptides are selected from the group consisting of alanine, β-alanine, alanine-glycine, leucine, and isoleucine.

In light of the foregoing, it should be appreciated that the present invention significantly advances the art by providing an oligoamide-modified elastomer that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

In prior work represented in U.S. patent application Ser. No. 14/396,951, it was demonstrated that by end-functionalizing polyisobutylene with oligo(β-alanine) a thermoplastic elastomer was obtained. However, it did not possess the high strength typical of thermoplastic elastomers. In an attempt to solve this problem, a grafted copolymer molecular architecture has been adopted.

The grafting architecture allows for easy adjustment of several structural parameters. First, the length of the oligo (β-alanine) segments (z) can be adjusted. This will change both the weight percent of hard content and the size of the crystalline domains in the oligo(β-alanine) chain direction. Second, the average molecular weight between hard segments ($M_H$) can also be adjusted. This can be achieved by grafting both non-hydrogen bonding groups and oligo(β-alanine) to the butyl chain. Having the ability to adjust $M_H$ allows z to be adjusted independently of hard segment weight percent.

Example 1

Synthetic Route 1

The first synthetic route for the oligoamide-grafted elastomer is shown in FIG. 2 using butyl rubber and oligo(β-alanine) as an example.

Synthesis of 4-Nitrophenyl Propiolate a1

A flask was charged with 4-nitrophenol (10.0 g, 71.8 mmol), and purged with nitrogen. Ethyl acetate (120 mL), and propiolic acid (4.46 mL, 71.8 mmol) were added to the flask, and the solution was chilled to 0° C. A separate solution of DCC (16.31 g, 79.07 mmol) in ethyl acetate (80 mL) was chilled under nitrogen atmosphere. The DCC solution was slowly added to the propiolic acid solution, and the solution was allowed to stir at 0° C. for 4 hours. The solution was then allowed to warm to room temperature and continued to stir over night. The resulting suspension was filtered and the solvent evaporated in vacuo. The product was then recrystallized from a 3:1 chloroform and hexane solution (7.60 g, 55%).

Synthesis of 4-Nitrophenyl Propiolate a2

A flask was charged with pentafluorophenol (10.95 g, 59.49 mmol), and purged with nitrogen. Ethyl acetate (120 mL), and propiolic acid (3.60 mL, 59.49 mmol) were added of the flask, and the solution was chilled to 0° C. A separate solution of DCC (13.50 g, 65.43 mmol) in ethyl acetate (80 mL) was chilled under nitrogen atmosphere. The DCC solution was slowly added to the propiolic acid solution, and the solution was allowed to stir at 0° C. for 4 hours. The solution was then allowed to warm to room temperature and continued to stir over night. The solution was then concentrated and recrystallized from ethyl acetate (4.3, 33%).

Synthesis of Grafted Butyl Rubber and b1 and b2

Butyl rubber (5.0 g, 1.31 mmol C═C, Mn=400,000 g/mol, PDI=1.2) was dissolved in anhydrous benzene (50 mL). Once the polymer was dissolved, the propiolic ester a1 or a2 was added (6.57 mmol) and allowed to stir until a homogenous solution was achieved. The AlCl3 (0.172 g, 1.32 mmol) was added and the solution allowed to stir for 15 hr. The polymer was then purified by precipitation in MeOH.

Synthesis of Grafted Butyl Rubber d1

The ester grafted butyl rubber, b1 (1 g, 0.26 mmol ester), was dissolved in anhydrous CHCl3 (10 mL). Next, compound c1 (0.067 g, 0.26 mmol) was added followed by Et3N (0.18 ml, 1.31 mmol). The solution was then set to reflux under a nitrogen atmosphere for 24 hours. The polymer was then purified by precipitation into methanol (0.97 g, 97%).

Synthesis of Grafted Butyl Rubber d2-d4

The same procedure was used as that for d1 except, c2-c4 were used, respectively, in place of c1.

Synthesis of Grafted Butyl Rubber g1-g4

Grafted butyl rubber d1-d4 hydrogenated with Wilkinson's catalysts under 100 psi of hydrogen in toluene at 100 C to remove the unsaturation in the backbone. This affords g1-g4.

For mechanical testing of g1-g4, samples were hot-pressed into a 1 mm thick mold under nitrogen protection. Each sample was heated to 20° C. above its respective melting temperature under pressure (5,000 lb). The temperature was then slowly reduced to the melting temperature and held for ten minutes at high pressure (15,000 lb). The sample was then cooled slowly to 10° C. below the melting temperature and held for an additional ten minutes. The press was then slowly cooled before removing the polymer and mold.

Figure 3:
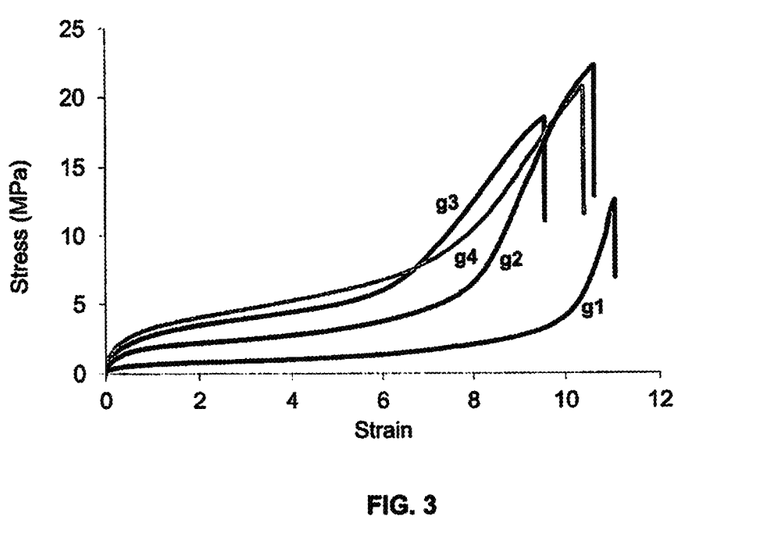
FIG. 3 shows the stress-strain curves of g1-g4 at room temperature.
Figure 4:
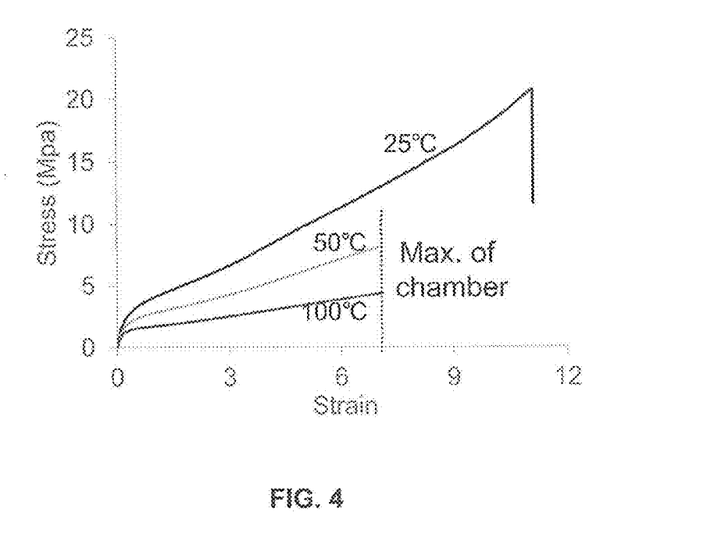
FIG. 4 shows the stress-strain curves of g3 at room temperature, 50° C., and 100° C.

Tensile tests were performed on the films mentioned above by first dieing out the sample with an ASTM D638 Type V dog bone die. Tensile tests were performed at ambient temperature at a strain rate of 50 mm/min until failure. Samples were loaded with a 40 mm gap distance and strain gauges were used to measure the strain. The strain gauges were set at a initial distance of 10 mm. The stress-strain curves of g1-g4 at room temperature are shown in FIG. 3. The stress-strain curves of g3 at various temperatures are shown in FIG. 4.

Figure 5:
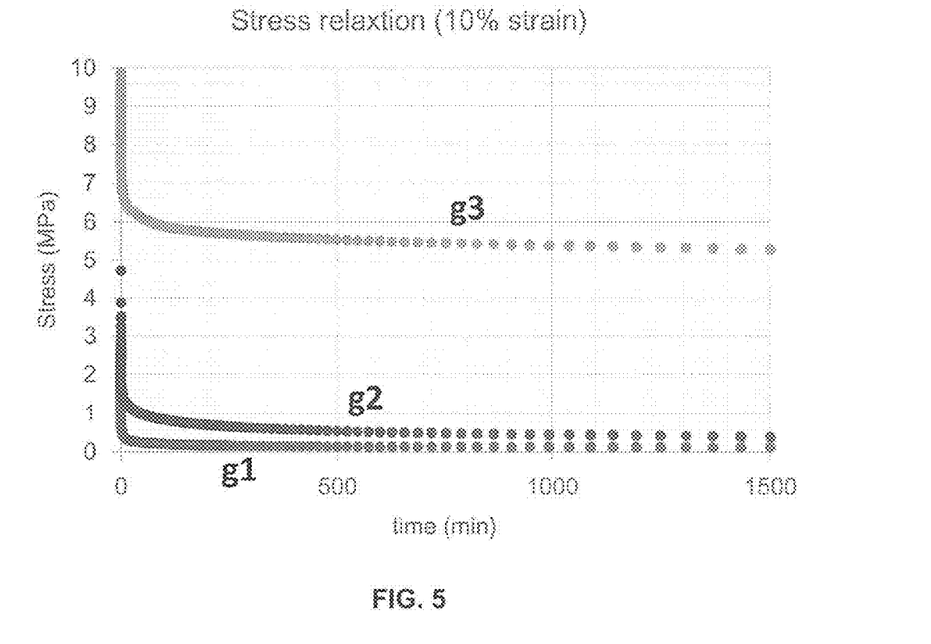
FIG. 5 shows the stress-relaxation curves of g1-g3 at room temperature.
Figure 6:
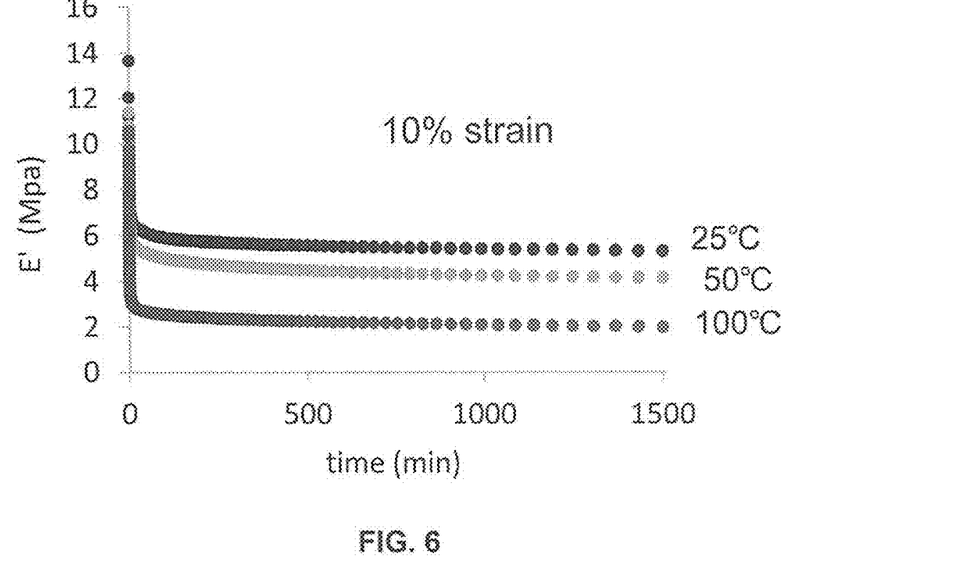
FIG. 6 shows stress relaxation curves of g3 at room temperature, 50° C., and 100° C.

The stress-relaxation experiments were carried out at 10% strain using the same type of specimens as those for tensile tests. The stress-relaxations of g1-g4 at room temperature are shown in FIG. 5. The stress-relaxations of g3 at various temperatures are shown in FIG. 6. These data show that the specimens are elastic solids at the corresponding temperatures.

Hysteresis and Set

Figure 7:
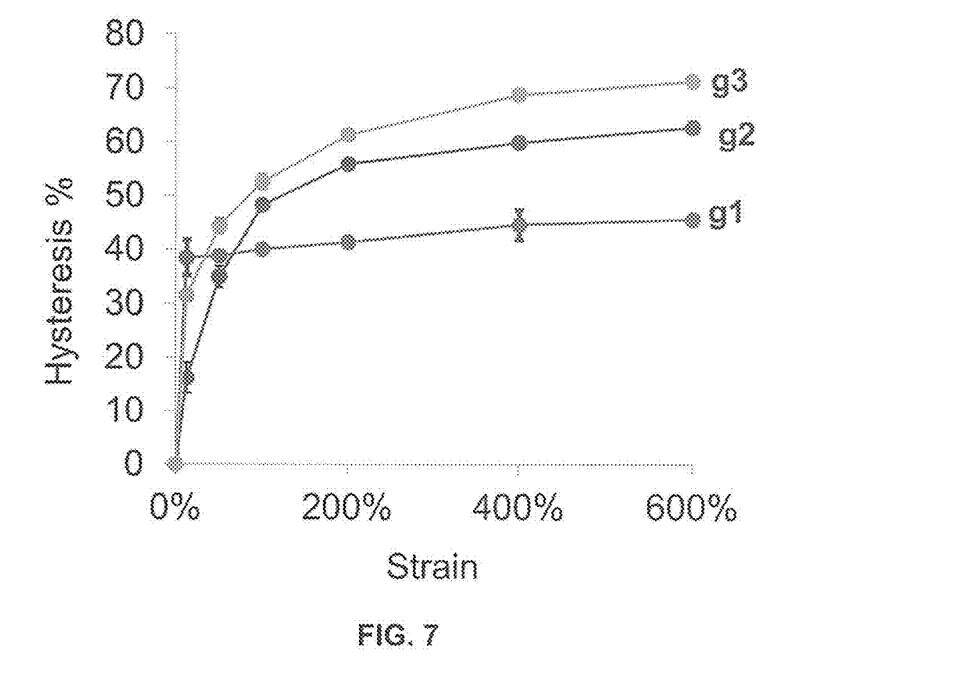
FIG. 7 shows the hysteresis of g1-g3 as a function of strain.
Figure 8:
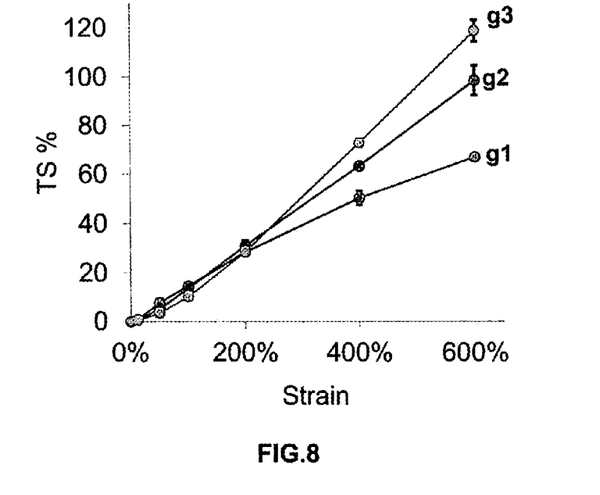
FIG. 8 shows the tensile set of g1-g3 as a function of strain.

Dog bone specimen of g1-g4 were clamped at a gap of 40 mm and deformed at a rate of 50 mm/min up to a gap of 150 mm and then returned back to 40 mm. The tensile set was measured at the start of a second cycle as the point when stress goes above zero. The hysteresis results are summarized in FIG. 7. The tensile set results are summarized in FIG. 8.

Example 2

Synthetic Route 2

The first synthetic route for the oligoamide-grafted rubber is shown in FIG. 2 using butyl rubber and oligo(β-alanine) as an example.

Synthesis of f

The formate modified butyl rubber e (0.81 g, 0.07 mmol formate groups) was dissolved in 15 ml chloroform. The alanine tetramer (0.23 g, 0.71 mmol), 4-dimethylaminopyridine (0.09 g, 0.71 mmol) and a few drops of trifluoroethanol were added into reaction solution. The reaction mixture was refluxed overnight, and then precipitated into about 100 ml methanol. The polymer product was purified by refluxing in methanol/hexane (volume ratio 3:1) solvent mixture for 2 hours. The methanol phase was removed. The hexane was removed in vacuum. The polymer was pumped in a vacuum oven for 6 hours.

Tensile Test of f

Figure 10:
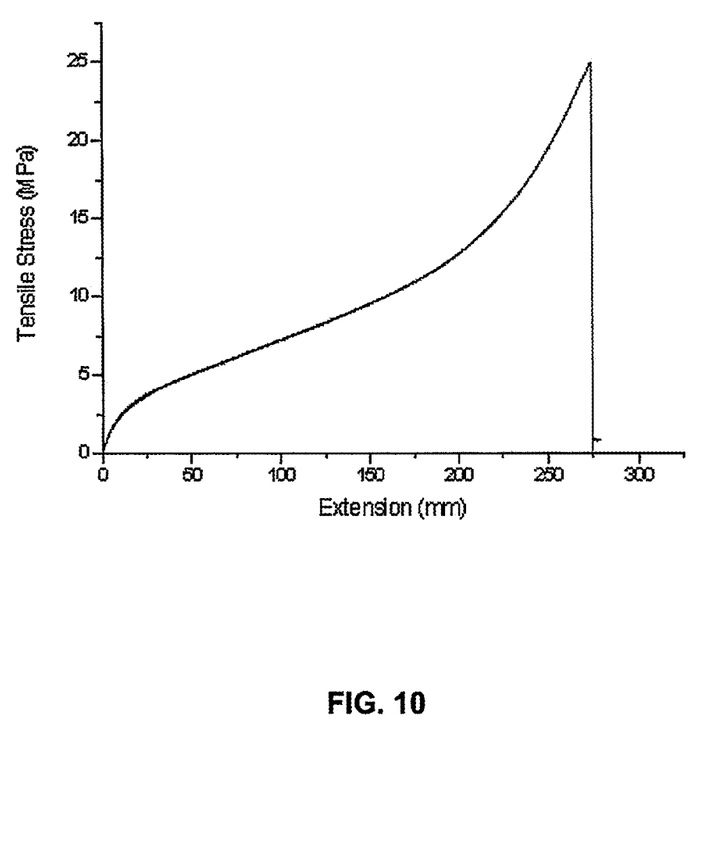
FIG. 10 shows the stress-strain curves of f at room temperature.

Polymer f that was synthesized as described above was subjected to tensile test. A sheet of the polymer 0.935 mm thick was pressed and annealed at 190° C. A dumbbell-shaped specimen was cut out using an ASTM D638 Type V mini die. The stress-extension curve was measured as room temperature at the extension rate of 100 mm/min. The tensile strength of the specimen was 24.5 MPa, as shown in FIG. 10.

For mechanical and rheological testing, all samples were hot-pressed into a 1 mm thick mold under nitrogen protection. Each sample was heated to 20° C. above its respective melting temperature under pressure (5,000 lb). The temperature was then slowly reduced to the melting temperature and held for ten minutes at high pressure (15,000 lb). The sample was then cooled slowly to 10° C. below the melting temperature and held for an additional ten minutes. The press was then slowly cooled before removing the polymer and mold. DMA tests were performed on an RSA 3 dynamic mechanical analyzer. Frequency sweep tests were performed at 30° C. The clamp distance was set at 5 mm and samples were deformed to a strain of 2% unless otherwise specified. DMA temperature sweep tests were performed under a nitrogen atmosphere at clamp distance of 5 mm, a frequency of 1 Hz, a strain of 2% unless specified otherwise, and a temperature ramp rate of 5° C./min was used.

Tensile tests were performed on the films mentioned above by first dieing out the sample with an ASTM D638 Type V dog bone die. Tensile tests were performed at ambient temperature at a strain rate of 50 mm/min until failure. Samples were loaded with a 40 mm gap distance and strain gauges were used to measure the strain. The strain gauges were set at an initial distance of 10 mm. Cyclic loading was performed on the same dog bone samples at a clamp distance of 40 mm and a speed of 50 mm/min and cycled to a max extension of 150 mm. Strain for these experiments was not measured with the strain gauge, but rather calculated from clamp displacement divided by the initial gap ($\epsilon/\epsilon_0$).

Perfluorophenyl Propiolate [8a]

A flask was charged with pentafluorophenol (10.95 g, 59.49 mmol) and purged with nitrogen. Ethyl acetate (120 mL) and propiolic acid (3.60 mL, 59.49 mmol) were added to the flask. The solution was chilled to 0° C. A separate solution of DCC (13.50 g, 65.43 mmol) in ethyl acetate (80 mL) was chilled under nitrogen atmosphere. The DCC solution was slowly added to the propiolic acid solution. The solution was stirred at 0° C. for 4 hours, and then removed from the cold bath and stirred at room temperature overnight. The resulting slurry was filtered to remove the insoluble DCU. The solution was then concentrated and recrystallized from ethyl acetate at 0° C. to produce brown crystals (4.3 g, 33%).

4-Nitrophenyl Propiolate [8b]

A flask was charged with 4-nitrophenol (10.0 g, 71.8 mmol) and purged with nitrogen. Ethyl acetate (120 mL) and propiolic acid (4.46 mL, 71.8 mmol) were added to the flask, and the solution was chilled to 0° C. A separate solution of DCC (16.31 g, 79.07 mmol) in ethyl acetate (80 mL) was chilled under nitrogen atmosphere. The DCC solution was slowly added to the propiolic acid solution, and the solution stirred at 0° C. for 4 hours. The solution was then allowed to warm to room temperature and stirred overnight. The resulting suspension was filtered to remove DCU, and the solvent evaporated in vacuo. The product was then recrystallized from a 3:1 chloroform and hexane solution at 0° C. to produce white crystals. The crystals were collected by vacuum filtration and dried in vacuo (7.60 g, 55%).

2,5-Dioxopyrrolidin-1-yl Propiolate [8d]

A flask was charged with N-hydroxysuccinimide (5.0 g, 43.44 mmol) and purged with nitrogen. Ethyl acetate (60 mL) and propiolic acid (2.23 mL, 35.9 mmol) were added to the flask and chilled to 0° C. A separate solution of DCC (8.15 g, 39.5 mmol) in ethyl acetate (40 mL) was chilled under nitrogen. The solution was stirred at 0° C. for 4 hours, and then removed from the cold bath and stirred at room temperature overnight. The resulting slurry was filtered to remove the insoluble DCU. The solution was then concentrated and recrystallized from ethyl acetate at 0° C. to give white crystals that were filtered out and dried under vacuum. (4.42 g, 68%)

Perfluorophenyl Propiolate Ester Grafted Butyl Rubber [9a]

Butyl rubber (100 g, 26.31 mmol isoprene units) was first dissolved in anhydrous benzene (1000 mL). Ester 8a (12.43 g, 52.63 mmol) was then added as a solid and quickly dissolved. A 1.8 M stock solution of EtAlCl$_2$ in toluene (14.61 mL, 26.31 mmol) was added dropwise to the solution in three separate charges. The reaction stirred for one hour and was then precipitated into MeOH stirred with a mechanical stirrer. Residual solvent was removed under reduced pressure (111 g, 99%).

4-Nitrophenol Propiolate Ester Grafted Butyl Rubber [9b]

Butyl rubber (5.0 g, 1.31 mmol C═C) was dissolved in anhydrous benzene (50 mL). 8b was added (6.57 mmol) and stirred until a homogenous solution was achieved. AlCl$_3$ (0.172 g, 1.32 mmol) was added, and the solution was stirred for 15 hr. The polymer was then isolated by precipitation in MeOH and dried under vacuum. (4.9 g, 98%).

Methyl Ester Grafted Butyl Rubber [9c]

Using 8c as the propiolic ester, the same procedure for 9b was used to make 9c (4.8 g, 96%)

Hydrogenation of 9a Using Wilkinson's Catalyst [10a]

An autoclave was charged with 9a (5 g, 2.1 mmol C═C), RhCl(PPh$_3$)$_3$ (0.04 g, 0.04 mmol), triphenylphospine (0.1 g, 0.42 m mol) and hexane (200 mL) in a glove box. After the polymer was dissolved, the autoclave was charged with hydrogen (700 psi) and heated to 100° C. for 48 hours. The polymer was isolated by precipitation in methanol and dried under vacuum (4.9 g, 98%)

Oligo(β-Alanine) Grafted Butyl Rubber, Hydrogenated [12a-12c]

The procedures for the grafting of oligomers 11a-11c to polymer 10a are the same.
A solution of 10a (5.0 g, 1.04 mmol ester) and 11a (0.23 g, 1.25 mmol) was prepared in anhydrous chloroform (50 mL) and anhydrous DMSO (5 mL) at room temperature under the protection of nitrogen. Et$_3$N (0.73 mL, 5.20 mmol) was added and the solution refluxed for 24 hours. The polymer was then isolated by precipitation in MeOH and dried under vacuum (4.8 g, 96%)
The synthesis of polymer 12b yielded 98% product. The synthesis of polymer 12c yielded 96% product.

Oligo(β-Alanine) Unsaturated Grafted Butyl Rubber [13a, 13b]

The procedures for the grafting of oligomers 11b and 11c to polymer 9a are the same. The procedure for 13a is provided below as an example.
The ester grafted butyl rubber, 9a (1 g, 0.21 mmol ester) was dissolved in anhydrous CHCl$_3$ (10 mL). Next, compound 11b (0.067 g, 0.26 mmol) was added followed by Et$_3$N (0.18 ml, 1.31 mmol). The solution was then set to reflux under a nitrogen atmosphere for 24 hours. The polymer was isolated by precipitation into methanol and dried under vacuum. (0.97 g, 97%) Polymer 13b yielded 98% product.

Synthesis

Four propiolate esters, 8a-8d, were synthesized by DCC coupling of propiolic acid to the appropriate alcohol (FIG. 4). Among them, 8a-8c were successfully grafted to butyl rubber through a Lewis acid-catalyzed ene reaction with the isoprene units, but 8d was unreactive toward butyl rubber under the conditions examined here. The effect of ene reaction conditions on backbone molecular weight was examined for the reaction of 8a and 8b with butyl rubber (Table 3.2 below).

TABLE 3.2

| | | | Resulting Molecular Weights after the Ene Reaction | | | | | |
|---|---|---|---|---|---|---|---|---|
| Trial | Ester | Isoprene Equivalents | Ester Equivalents | EtAlCl3 Equivalents | AlCl3 Equivalents | Reaction Time (Hr) | Mn | Mw/Mn |
| Starting Polymer | — | — | — | — | — | — | 486,400 | 1.2 |
| 1 | 8b | 1 | 5 | — | 1 | 66 | 247,000 | 1.67 |
| 2 | 8b | 1 | 5 | — | 1 | 18 | 231,500 | 1.54 |
| 3 | 8b | 1 | 1 | — | 1 | 24 | 43,300 | 1.72 |

TABLE 3.2-continued

Resulting Molecular Weights after the Ene Reaction

| Trial | Ester | Isoprene Equivalents | Ester Equivalents | EtAlCl3 Equivalents | AlCl3 Equivalents | Reaction Time (Hr) | Mn | Mw/Mn |
| --- | --- | --- | --- | --- | --- | --- | --- | --- |
| 4 | 8b | 1 | 2 | — | 1 | 24 | 75,570 | 1.37 |
| 5 | 8b | 1 | 5 | — | 0.5 | 48 | 108,400 | 1.4 |
| 6 | 8a | 1 | 2 | 1 | — | 3 | 343,000 | 1.4 |
| 7 | 8a | 1 | 2 | 1 | — | 1 | 449,400 | 1.4 |

Hydrogenation of 9a by Wilkinson's catalyst was carried out to remove any unsaturation in the butyl rubber backbone. This was done to avoid unwanted side reactions of the unsaturated bonds during high temperature processing of the final polymers.

β-Alanine oligomers, 11a-11c, were synthesized by solution phase coupling techniques. The oligo(β-alanine)s were coupled to 9a and 10a to give oligo(β-alanine) grafted copolymers 12a-12c, 13a and 13b. Mechanical stirring was required to break up oligo(β-alanine) association and ensure a complete reaction. Alternatively, the addition of DMSO (10 vol %) was found to break up aggregation.

Butyl rubber with mixed grafts of different oligo(β-alanine) lengths were synthesized. Oligo(β-alanine)s 11a and 11b were grafted to 9a at ratios of 10:1 and 1:1 to give polymers 12e and 12d, respectively.

What is claimed is:

1. An oligoamide-modified elastomer comprising;
an elastomer with a number average molecular weight no less than 80,000 g/mol and a weight-average molecular weight no less than 100,000 g/mol having oligoamide units grafted to said elastomer and forming a plurality of sheet-like structures through hydrogen bonding, the sheet-like structures interacting through non-covalent interactions to form crystalized domains within the elastomer.

2. The oligoamide-modified elastomer of claim 1, wherein the oligoamide units are selected from peptides, β-peptides, and aramid oligomers.

3. The oligoamide-modified elastomer of claim 2, wherein the oligoamide units are covalently linked to the elastomer.

4. The oligoamide-modified elastomer of claim 1, wherein the oligoamide units are β-alanines according to the following structure:

wherein z is from 1 to 6.

5. The oligoamide-modified elastomer of claim 1, wherein the oligoamide units are aramids according to one of the following structures:

wherein z is from 1 to 6.

6. The oligoamide-modified elastomer of claim 1, wherein said elastomer has a glass transition temperature Tg below room temperature, and the oligoamide-modified elastomer has a Tg above room temperature.

7. The oligoamide-modified elastomer of claim 1, wherein said elastomer is selected from the group consisting of poly(isobutylene-co-isoprene), polyisoprene, polybutadiene, poly(styrene-co-butadiene), poly(dimethylsiloxane), ethylene propylene diene monomer (EPDM) rubber, hydrogenated polybutadiene, hydrogenated polyisoprene, hydrogenated poly(styrene-cobutadiene), and combinations and derivatives thereof.

8. The oligoamide-modified elastomer of claim 1, wherein said elastomer is poly(isobutylene-co-isoprene).

9. A process of forming a thermoplastic elastomer comprising the steps of:
covalently linking oligoamide units as pendant groups on an elastomer, the oligoamide units forming a plurality of sheet-like structures through hydrogen bonding, the sheet-like structures interacting through non-covalent interactions to form crystalized domains within the elastomer.

* * * * *